(12) United States Patent
Kawaguchi et al.

(10) Patent No.: US 6,808,396 B2
(45) Date of Patent: Oct. 26, 2004

(54) CONNECTION OF A USER IDENTITY MODULE TO A COMPACT CARD CASE

(75) Inventors: Dean Kawaguchi, San Jose, CA (US);
Nhan Tri Nguyen, San Jose, CA (US);
Mark Unruh, San Jose, CA (US);
Patrick Wallace, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/156,294

(22) Filed: May 24, 2002

(65) Prior Publication Data

US 2003/0220022 A1 Nov. 27, 2003

(51) Int. Cl.7 .................................................. H01R 9/09

(52) U.S. Cl. ....................................... 439/76.1; 439/946

(58) Field of Search ................................ 439/630, 76.1; 235/486, 492; 361/737; 499/945, 946

(56) References Cited

U.S. PATENT DOCUMENTS

| 5,563,400 A | * 10/1996 | Le Roux ..................... 235/486 |
| 5,737,582 A | * 4/1998 | Fukuzumi |
| 6,053,748 A | * 4/2000 | Bricaud et al. ............ 439/76.1 |
| 6,145,748 A | * 11/2000 | Neifer ........................ 235/486 |
| 6,408,352 B1 | * 6/2002 | Hosaka ....................... 439/490 |
| 2002/0076945 A1 | * 6/2002 | Chen et al. |

* cited by examiner

*Primary Examiner*—Neil Abrams
(74) *Attorney, Agent, or Firm*—Fay Kaplun & Marcin, LLP

(57) ABSTRACT

A method and system for connecting a user identification module to a wireless host device are described. The user identification module is inserted in an accessory card that fits in the host device, and includes a radio transreceiver to connect to a wireless network. When the accessory card is placed in the host device, a mating surface of the host device blocks removal of the user identification module from the accessory card. The accessory card may be connected to the host device by inserting in a slot of the host device an edge of the accessory card from which extends an interface.

14 Claims, 5 Drawing Sheets

CONNECTION OF A USER IDENTITY MODULE TO A COMPACT CARD CASE

FIELD OF THE INVENTION

The present invention relates to methods and systems for connecting modules to electronic cards, and in particular to methods for providing mechanically fail-safe connections between electronic components.

BACKGROUND INFORMATION

The proliferation of portable and hand held computing and communication devices has brought about unprecedented challenges in providing secure transmissions of data between devices connected to a wireless network. An important element of securing data is to identify the device, or the subscriber using a device within the network. It is also important to provide standardization, such that different devices from various manufacturers are able to share data over the same wireless network. This is performed by using certain protocols and standards for the networks, coupled with hardware incorporated in the mobile devices.

One set of standards used by devices such as portable telephones or personal digital assistants (PDA's) that are connected to a wireless network, includes the Global System for Mobile Communications (GSM) standard. GMS specifies the infrastructure to be used in a digital cellular service. GSM subscriber data is typically carried on a Subscriber Identity Module (SIM), which is a "smartcard" or similar device connected to the circuitry of the wireless device. The subscriber data in the SIM card allows the network to determine if, and to what extent, the user is allowed to access the network. Without the SIM card the portable telephone, PDA or other portable computing device is unable to access the network.

The assembly and removal of SIM cards in a device is governed by provisions specified in the GSM standard. In addition, it is beneficial to minimize the amount of space taken up by the SIM card, since miniaturization is a valuable attribute of portable devices. It is also important to provide a fail-safe way of correctly aligning and engaging the SIM card into the appropriate connector slot, to simplify the steps required to connect the SIM card to the wireless device.

SUMMARY OF THE INVENTION

Accordingly, in one aspect embodiments of the present invention include a component for enabling wireless network connection of a host device which includes an accessory card adapted for electrical connection and disconnection with the host device, a connector of the accessory card for interfacing with electrical components of the host device, and a radio transreceiver of the accessory card. The component also has a user identification module connectable to the accessory card and removable from the accessory card when said accessory card is not in electrical connection with the host device.

In another aspect, the invention is a method of enabling access to a wireless network by a host component. The method includes providing a user identification module identifying the host component, inserting the user identification module in an accessory card, and connecting the accessory card to the host device, whereby a mating portion of the host device interferes with removal of the user identification module when the accessory card is connected.

DETAILED DESCRIPTION

Devices that are connected to a wireless network require a system to identify themselves to the network, to prevent unauthorized access to data in the network. The device itself may be identified with the network, or, more often, the user of the device is identified as a subscriber to the network. Since the transmissions between devices connected to the wireless network can be received by unauthorized recipients, it is also important to encrypt those transmissions, to prevent eavesdropping. These functions are carried out by specialized components and software within the devices, in accordance with widely accepted standards and protocols.

One set of standards used by devices such as portable telephones or personal digital assistants (PDA's) that are connected to a wireless network is the Global System for Mobile Communications (GSM). This standard specifies the infrastructure to be used in a digital cellular service. GSM standards address much of the wireless network infrastructure, such as the radio interface, switching, signaling and intelligent network. Adherence to these standards insures service interoperability and allows subscribers to roam across networks, as well as provide for subscriber identification.

GSM subscriber data is typically carried on a Subscriber Identity Module (SIM), which is a "smartcard" or similar device connected to the circuitry of the wireless device. The SIM card identifies the subscriber to the network, such that the subscriber's data rather than the data of the wireless unit is seen by the network. Each SIM card contains a microchip that houses a microprocessor and a memory. The SIM card includes information to identify to the network the user as a legitimate user, with access privileges to the network. The SIM card may also contain information and programming to encrypt the data being transmitted, such that eavesdropping on network communications becomes nearly impossible.

In the exemplary embodiment of the present invention described herein, the standard used is the GSM 11.11, a more specific version of the general GSM standard. GSM 11.11 requires that once a device is connected to a wireless network such as a Wide Area Network (WAN), the SIM module cannot be removed from the device's circuitry without first disconnecting the device from the WAN, either by logging out or by powering off the device. Accordingly, the present invention provides a SIM connection that can be undone only after signal from the WAN has been interrupted, and in one embodiment only after power to the network connection has been removed.

Figure 1:
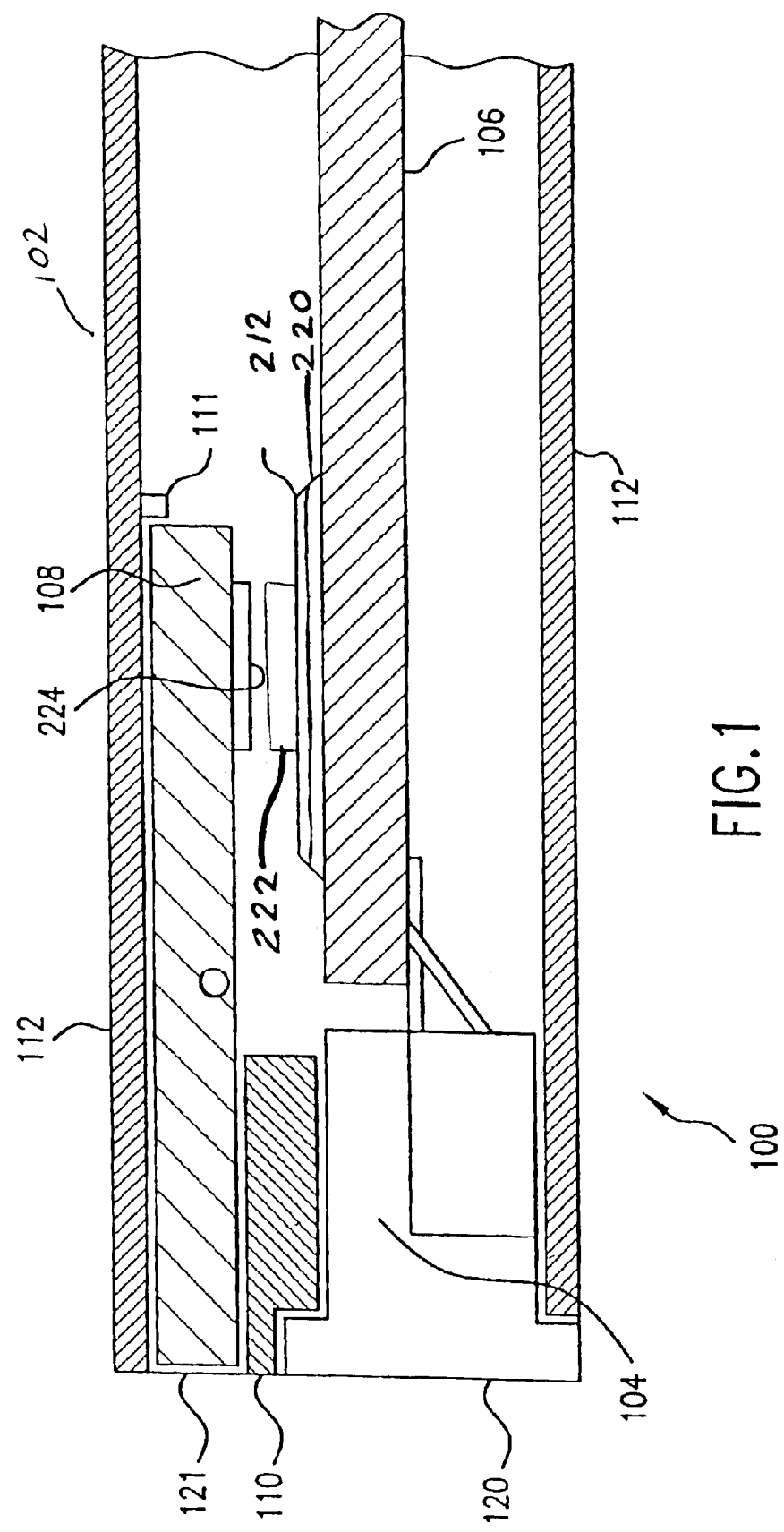
FIG. 1 shows a cross sectional elevation view of an accessory card according to embodiments of the present invention.

FIG. 1 shows an exemplary embodiment of the connection between a SIM module and a device adapted for use in a wireless network, according to the present invention. In this embodiment, the SIM module is secured on the case of an accessory or flash card such as a Type II Card, which in turn is connected to the device. The accessory card with the SIM module contain all the elements for enabling the host device to connect with the wireless network. The Type II card may be a PCMCIA card for a personal computer, or a flash card for use in a PDA. The card is generally used for input/output control, such as for a modem, LAN, host communications and wireless WAN access. Type II cards are generally 5 mm thick, and are connected to the device through an interface that provides power to the device, as well as transmission of signals to and from the card. To that end, the Type II card includes a radio transreceiver capable of exchanging data with other radios on the network. The device hosting the Type II card may be any kind of wireless computing device, telephone, PDA or other portable unit that can interface with the wireless WAN.

As shown in the drawings, the arrangement of the SIM module in the Type II card complies with the requirements of the GSM 11.11 standard. The Type II card encloses the radio used to connect the device with the wireless WAN, and the SIM module. As required by the GSM 11.11 standard, the SIM module cannot be removed from the Type II card once the device is connected to the WAN using the radio, unless the connection to the WAN is severed. In this exemplary case, the SIM module is enclosed in the Type II card so that its removal and installation can be accomplished only after the card has been disconnected from the device, thus interrupting power and signal transfer to the radio.

FIG. 1 shows an assembly 100 that includes the accessory card 102 that is required to enable a device, not shown in the drawing, to connect to a wireless network. Accessory card 102 may be connected to the host device by inserting in a slot of the host device an edge of the accessory card from which extends an interface. The accessory card may be completely or only partially inserted in the host device. It will be apparent to those skilled in the art that other type of cards may be used without departing from the scope of the invention. Accessory card 102 includes top and bottom card cover plates 112, which protect the interior components. A printed circuit board (PCB) 106 is housed within Accessory card 102, and contains all the elements necessary to connect the device to the wireless network, including a radio with a receiver element and a transmitter element. PCB 106 may include various elements used to support the radio transreceiver operation, including semiconductor chips programmed to carry out various functions, for example encryption and decryption of radio signals, and manipulation of data exchanged with the host device.

Figure 2:
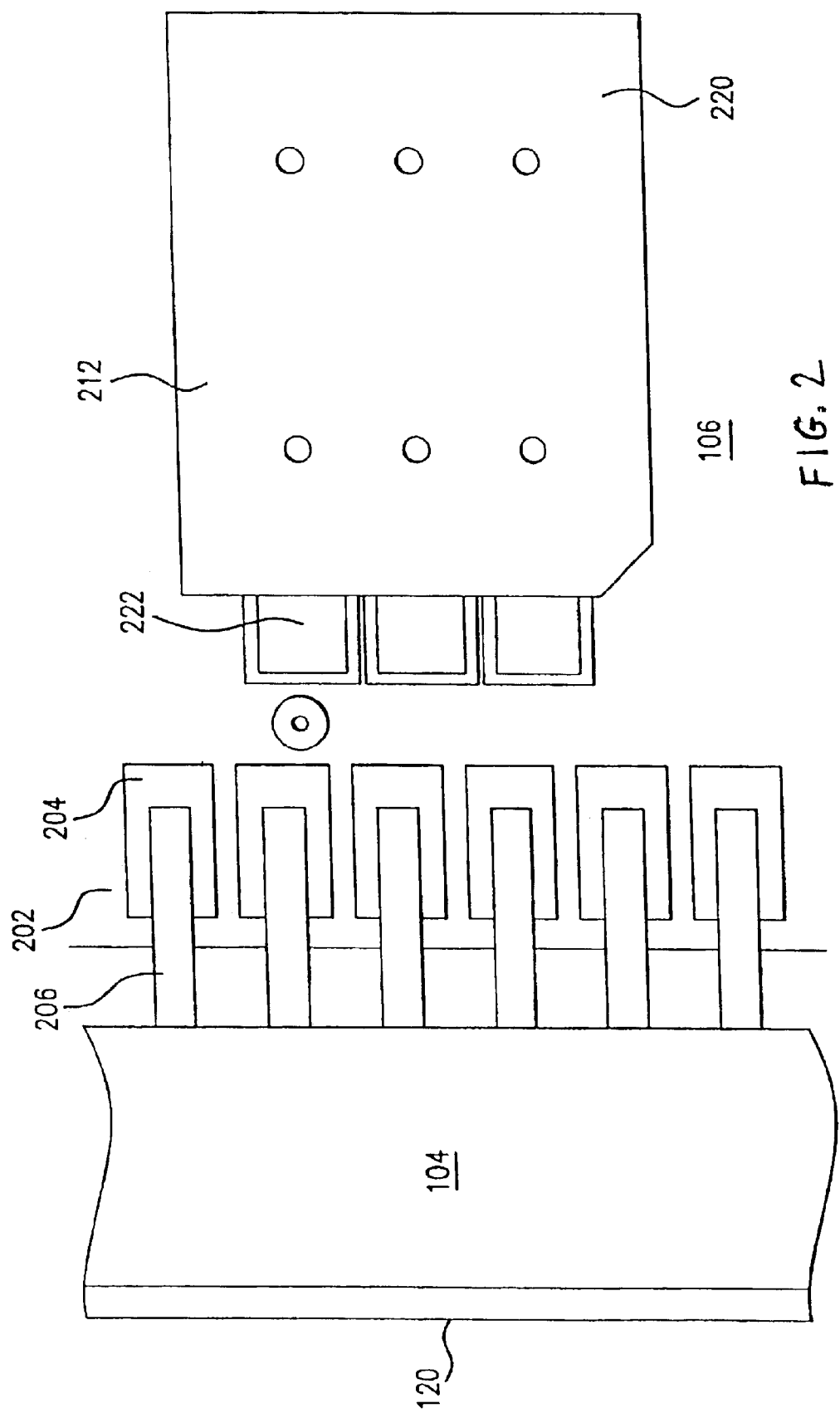
FIG. 2 is a top cross sectional view of connections of the accessory card shown in FIG. 1.

PCB 106 includes an interface portion 202, shown in FIG. 2, through which power and signals are exchanged between PCB 106 and the host device. For example, interface portion 202 may have a host interface receptacle 104, such as a 50 holes pin receptacle, disposed on the insertion surface 120 of the card 102. A corresponding 50 pin plug may be placed on the host device, to mate with host interface receptacle 104. In the embodiment shown, PCB 106 includes solder pads 204 to which are attached connectors 206, which extend to the host interface receptacle 104. As shown in more detail in FIG. 1, PCB 106 containing the radio transreceiver is placed in close proximity to host interface receptacle 104, to minimize the depth of Accessory card 102. This particular type of card has a standard thickness of 5 mm and specified dimensions, however, other types of cards having different dimensions may be used in the present invention.

A SIM module or card 108 may be inserted in accessory card 102. To conform with the GSM 11.11 standard, as described above, the SIM module must not be removable while a network connection persists. To accomplish that, SIM module 108 is contained within accessory card 102, and is connected to radio PCB 106. SIM module 108 can be inserted and removed from accessory card 102 through a slot or opening 121 formed in insertion surface 120. In this manner, insertion and more importantly removal of SIM module 108 is impossible while accessory card 102 is connected to the device by means of host interface receptacle 104. When accessory card 102 is inserted in the host device, the body of the host device, and in particular a mating portion of the host device blocks slot 121, preventing removal of SIM module 108. A set of guides 110 may be formed in the casing of Accessory card 102 to guide the SIM module 108 in the correct placement. Depth guides 111, in the form of a ridge or protrusion, may be used to limit the depth of penetration of SIM module 108 within Accessory card 102. In one exemplary embodiment, the SIM module 108 is located above and adjacent the host interface receptacle 104.

The Accessory card 102 containing SIM module 108 must be inserted in the appropriate slot of the host device to enable it to access the wireless network, as indicated above. Accordingly, before using the device, SIM module 108 is inserted in the Accessory card 102 through slot 121. Accessory card 102 is then inserted in the host device, surface 120 first, with host interface receptacle 104 mating with the apposite connector of the device. The host device is then ready to connect to the wireless network, using the radio transreceiver found on PCB 106 of Accessory card 102. The SIM module 108 is locked in place, and as mandated by the GSM 11.11 standard cannot be removed unless Accessory card 102 is first detached from the host device, resulting in interruption of the signal to and from the wireless network, and of the power supply to the radio.

SIM module 108 may be connected to PCB 106 through an interface 212. Interface 212, shown in FIG. 2, includes a base 220 and a plurality of contact pads 222 that may be disposed on one or more edges of base 220. Contact pads 222 are adapted to form an electrical connection with corresponding pads or brushes 224, formed on the underside of SIM module 108. As SIM module 108 is slidably inserted in Accessory card 102, brushes 224 touch contact pads 222, and the connection is formed. One consideration in positioning the base 220 is to maximize the amount of space on PCB 106 that is available for installation of other devices. For example, various integrated circuits, electrical components and other structures may be placed on PCB 106, to support the radio transreceiver and associated elements. Accordingly, it is preferable to place base 220 away from the geometric center of PCB 106, and closer to one of its edges.

The orientation of SIM module 108 also affects the amount of free space that is available for other devices and elements on PCB 106. Generally, SIM cards have a 45 degree chamfer 300, best seen in FIGS. 3 and 4. Chamfer 300 is used as an orientation marker, to prevent incorrect insertion of SN module 108 in conventional applications. A protrusion matching chamfer 300 may be formed, so that full insertion of the SIM module is only possible when chamfer 300 abuts the protrusion. However, in the interest of minimizing the footprint of SIM module 108 over PCB 106, the conventional method of aligning SJM module 108 using chamfer 300 may be disregarded instead, guides 110, 111 or similar guiding and movement limiting protrusions may be employed, so that SIM module 108 can be oriented in the most beneficial direction.

Figure 3:
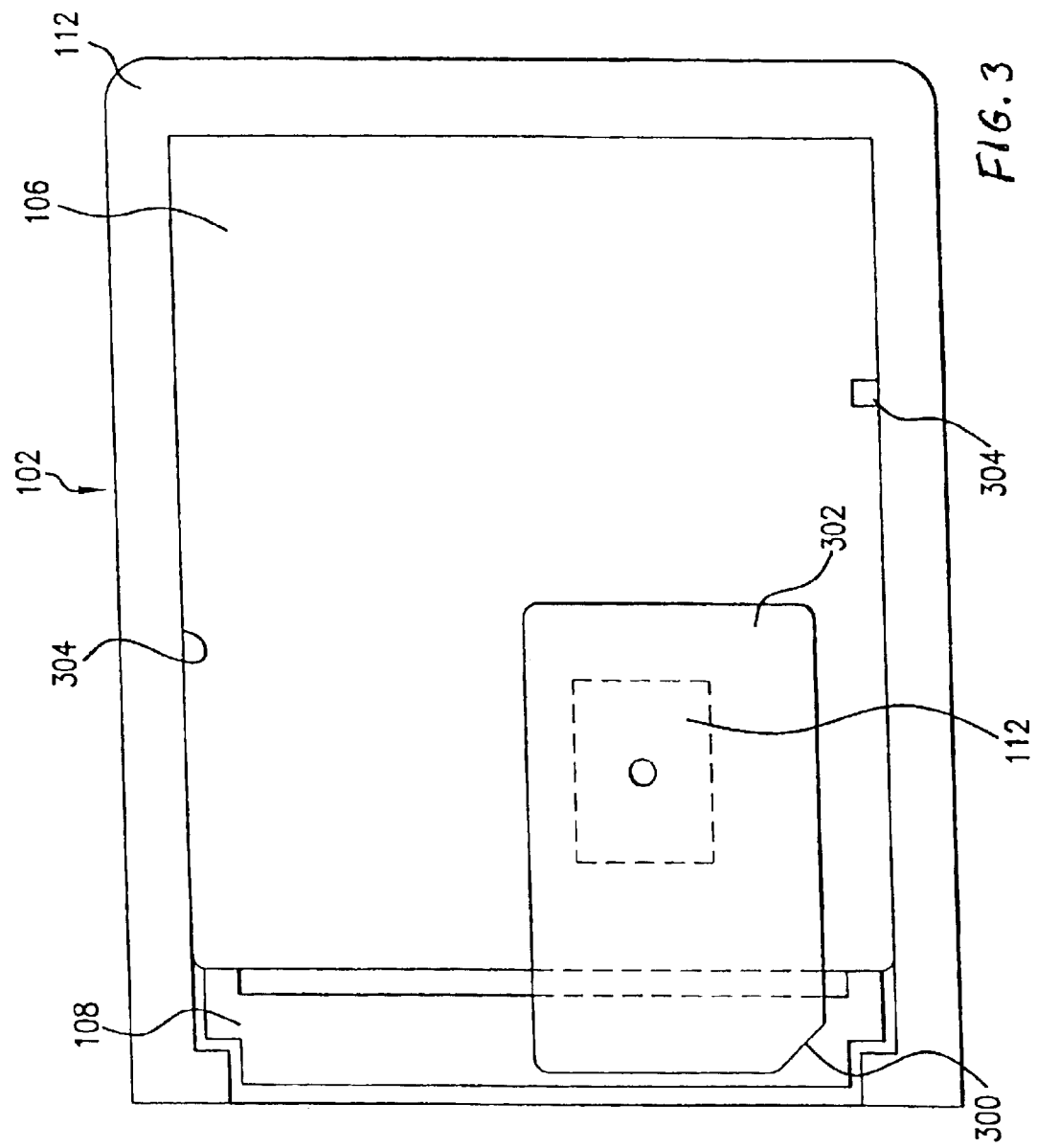
FIG. 3 is a top elevation of an accessory card according to one embodiment of the invention.
Figure 4:
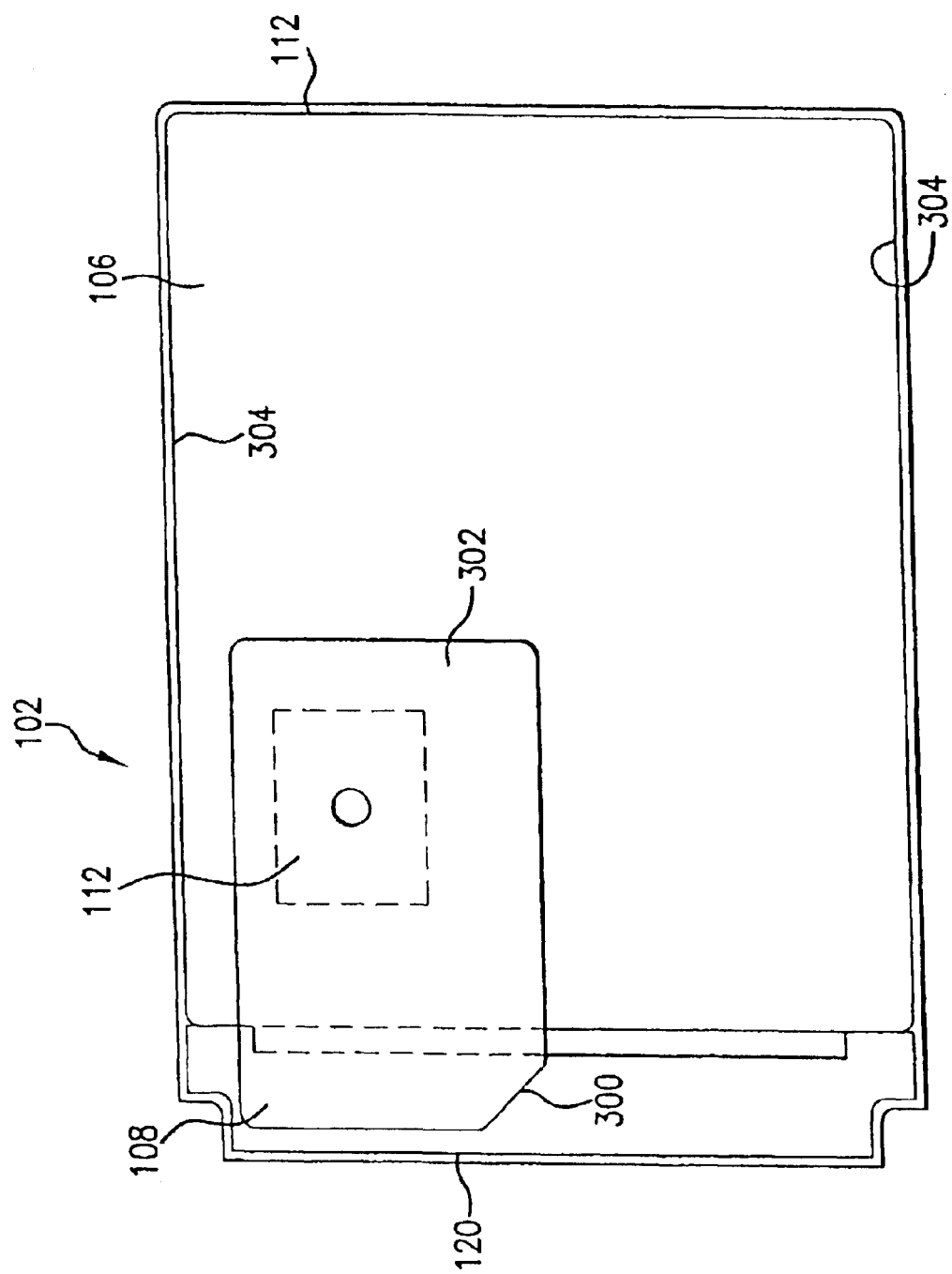
FIG. 4 is a top elevation of an accessory card according to another embodiment of the invention.

Due to the location of contact brushes 224 on the underside of SIM module 108, the smallest footprint on PCB 106 is obtained by inserting SIM module 108 with chamfer 300 facing outward, opposite to the conventional insertion orientation. When SIM module 108 is so oriented, as shown in FIGS. 3 and 4, rear surface 302 has to be pushed the least distance into Accessory card 102. The largest amount of surface of PCB 106 is thus left available for application of other electronic components. As shown in FIGS. 3 and 4, SIM module 108 is preferably positioned away from the centerline of PCB 106, towards edges 304 of accessory card 102. In one embodiment, a gap is left between side surfaces 304 of accessory card 102 and the sides of SIM module 108. The gap is designed to facilitate manufacturing of the casing for accessory card 102, in particular when the casing is made by molding. For example, the gap may have a dimension of at least about 0.25 mm, to provide sufficient clearance during manufacturing.

Figure 5:
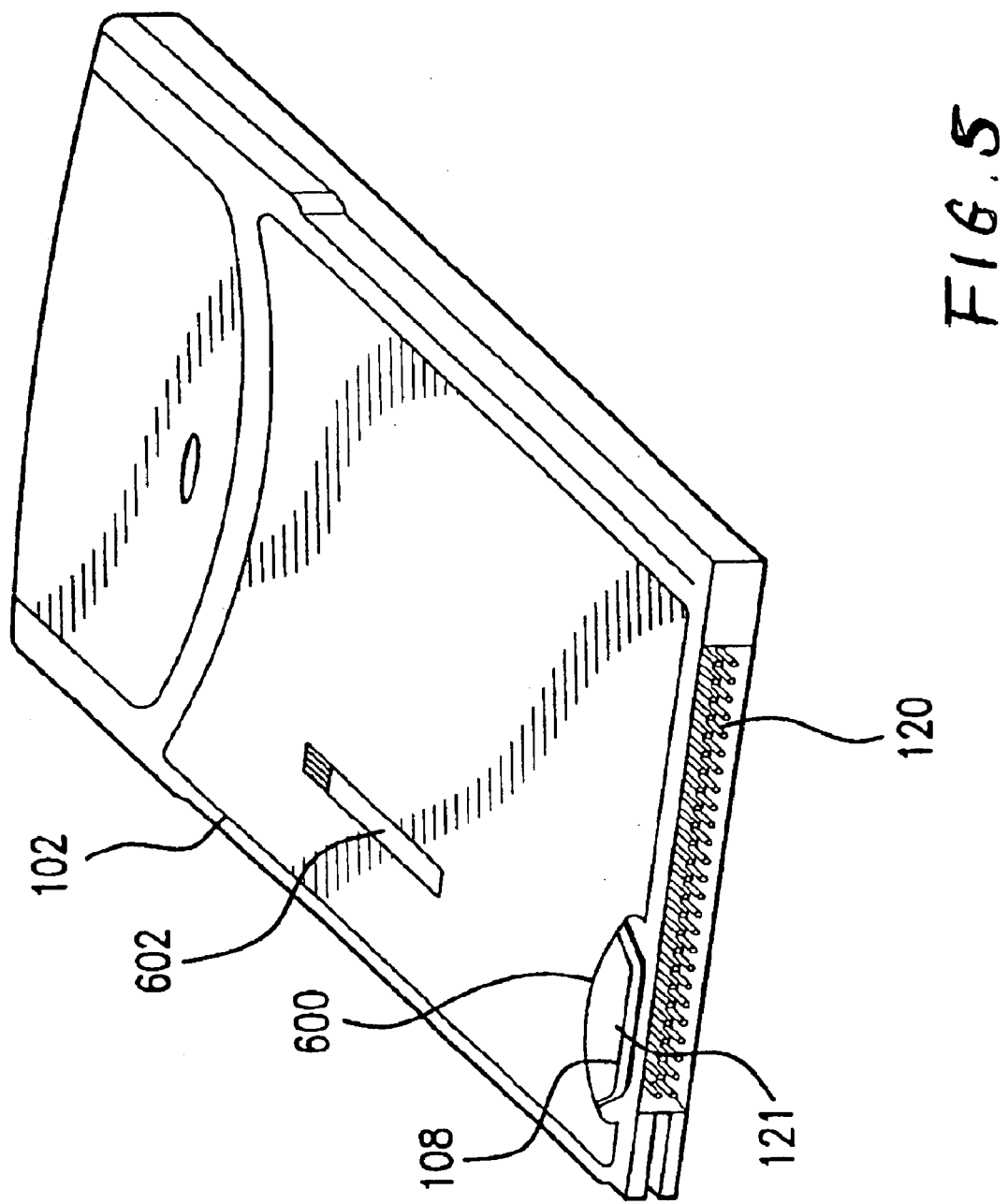
FIG. 5 is a perspective view of the accessory card shown in FIG. 1.

FIG. 5 shows a perspective view of accessory card 102, with the SIM module 108 fully inserted therein. As can be seen from the drawing, once insertion surface 120 is inserted in the host device, access to SIM module 108 is blocked by the host device. A notch 600 and an opening 602 may be formed in the casing of accessory card 102 to facilitate removal of SIM module 108, once the accessory card 102 is removed from the host device. 224, formed on the underside of SIM module 108. As SIM module 108 is slidably inserted in Accessory card 102, brushes 224 touch contact pads 222, and the connection is formed. One consideration in positioning the base 220 is to maximize the amount of space on PCB 106 that is available for installation of other devices. For example, various integrated circuits, electrical components and other structures may be placed on PCB 106, to support the radio transreceiver and associated elements. Accordingly, it is preferable to place base 220 away from the geometric center of PCB 106, and closer to one of its edges.

The present invention has been described with reference to specific exemplary embodiments, however it is understood that those skilled in the art will be able to devise additional embodiments. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A component for enabling a wireless network connection of a host device, comprising:
   an accessory card adapted for electrical connection and disconnection with the host device, the accessory card being at least partially received within a housing of the host device, the accessory card including a connector extending along an insertion surface of the accessory card for interfacing with electrical components of the host device and a radio transreceiver, the accessory card further including an insertion slot including a user identification module receiving opening; and
   a user identification module connectable to the accessory card by insertion into the insertion slot via the user identification module receiving opening, wherein the user identification module receiving opening faces the insertion surface so that the user identification module is removable from the accessory card only when an electrical connection between the accessory card and the host device is severed.

2. The component according to claim 1, wherein the user identification module is insertable in the insertion slot of the accessory card from a direction substantially perpendicular to the insertion surface.

3. The component according to claim 1, wherein the user identification module is adapted to be inserted in the accessory card above the connector of the accessory card.

4. The component according to claim 1, wherein the accessory card is a Type II accessory card.

5. The component according to claim 1, wherein the user identification module is a SIM module.

6. The component according to claim 5, wherein the SIM module, when inserted in the accessory card, is oriented with a chamfer of the SIM module facing away from the accessory card.

7. The component according to claim 1, further comprising:
   an interface formed on the radio transreceiver adapted to form a connection with the user identification module.

8. The component according to claim 7, wherein a centerline of the interface is displaced laterally from a centerline of the radio transreceiver.

9. The component according to claim 7, wherein the interface includes contact pads adapted for sliding contact with contact brushes of the user identification module.

10. The component according to claim 1, wherein the connector is adapted to mate with a connector portion of the host device extending above the connector, such that the connector portion of the host device precludes access to a user identification module insertion slot.

11. The component according to claim 1, further comprising:
   guide elements to guide and limit movement of the user identification module in the accessory card.

12. A method of enabling access to a wireless network by a host component, comprising the steps of:
   providing a user identification module identifying the host component;
   inserting the user identification module into an accessory card by introducing the user identification module through an insertion slot located along an insertion surface of the accessory card via a user identification module receiving opening, wherein the user identification module receiving opening faces the insertion surface so that the user identification module is removable from the accessory card only when an electrical connection between the accessory card and the host device is severed;
   connecting the accessory card to the host device so that the accessory card at least partially received within a housing of the host device; and
   abutting the insertion surface of the accessory card to mating portion of the host device.

13. The method according to claim 12, further comprising the step of:
   placing the user identification unit in electrical contact with a radio transreceiver of the accessory card.

14. An arrangement for enabling a wireless connection by a host device to a wireless network, comprising:
   an accessory card adapted for electrical connection and disconnection with the host device, the accessory card being at least partially received within a housing of the host device, the accessory card including a connector for interfacing with electrical components of the host device and a radio transreceiver for the wireless connection to the wireless network; and
   a user identification module is connectable to the accessory card,
   wherein the user identification module is insertable in an insertion slot located above the connector, the connector being adapted to mate with a connector portion of the host device extending above the connector so that the connector portion of the host device precludes access to the insertion slot.

* * * * *

UNITED STATES PATENT AND TRADEMARK OFFICE
CERTIFICATE OF CORRECTION

PATENT NO. : 6,808,396 B2
DATED : October 26, 2004
INVENTOR(S) : Kawaguchi et al.

It is certified that error appears in the above-identified patent and that said Letters Patent is hereby corrected as shown below:

Column 5,
Lines 18-28, please delete the following:
"224, formed on the underside of SIM module 108. As SIM modile 108 is slidably inserted in Accessory card 102, brushes 224 touch contact pads 222, and the connection is formed. One consideration in positioning the base 220 is to maximize the amount of space on PCB 106 that is available for installation of other devices. For example, various integrated circuits, electrical components and other structures may be placed on PCB 106, to support the radio transreceiver and associated elements. Accordingly, it is preferable to place base 220 away from the geometric center of PCB 106, and closer to one of its edges."

Column 6,
Line 58, delete "is".

Signed and Sealed this

First Day of February, 2005

JON W. DUDAS
*Director of the United States Patent and Trademark Office*